United States Patent Office 3,448,150
Patented June 3, 1969

3,448,150
N-HYDROXYALKYL DERIVATIVES OF DI-PHENYLSULFONE POLYCARBOXAMIDES
William J. Farrissey, Jr., North Branford, James S. Rose, Guilford, and Adnan A. R. Sayigh, North Haven, Conn., assignors to The Upjohn Company, Kalamazoo, Mich., a corporation of Delaware
No Drawing. Filed May 25, 1967, Ser. No. 641,121
Int. Cl. C07c *103/24;* C08g *17/18;* C07d *27/52*
U.S. Cl. 260—559                        2 Claims

ABSTRACT OF THE DISCLOSURE

Novel N-hydroxyalkyl derivatives of diphenylsulfone polycarboxamides (tetra-N-hydroxyethyl derivative of diphenylsulfone-3,3′,4,4′-tetracarboxamide is typical) are provided. These polyols are intermediates for cellular and non-cellular polyurethanes. The novel compounds are prepared from the corresponding polycarboxylic acids by conventional methods for amide formation.

BACKGROUND OF THE INVENTION

Field of the invention

This invention relates to novel polyols and is more particularly concerned with novel N-hydroxyalkyl derivatives of diphenylsulfone polycarboxamides and with processes for their preparation.

Description of the prior art

Although diphenylsulfone polycarboxylic acids are well-known in the art, see for example U.S. Patents 2,673,218 and 3,022,320, it has not previously been suggested that the corresponding N-hydroxyalkylamides could be prepared or that said amide derivatives would be valuable as intermediates in the preparation of polyurethanes particularly in the preparation of rigid polyurethane foams and of polyurethane elastomers and coatings.

BRIEF SUMMARY OF THE INVENTION

The novel compounds of the invention are those having the formula:

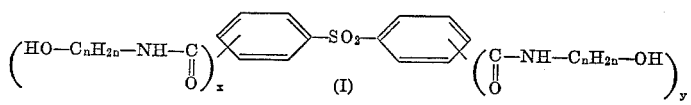

wherein $C_nH_{2n}$ represents alkylene from 2 to 6 carbon atoms, inclusive, and $x$ and $y$ are each integers from 1 to 2.

The term "alkylene from 2 to 6 carbon atoms, inclusive," means a divalent aliphatic hydrocarbon radical having the stated number of carbon atoms therein. Illustrative of such groups are ethylene, 1,2-propylene, 1,3-propylene, 1,4-butylene, 1,2-pentylene, 1,3-hexylene, 2,2-dimethyl-1,3-propylene, 2-methyl-1,4-butylene, 3-methyl-1,2-pentylene, and the like.

The novel compounds of the Formula I are polyols which are useful in the preparation of both cellular and non-cellular polyurethanes which can be prepared therefrom by reaction with polyisocyanates under conditions well-known in the art; see, for example, Saunders et al. Polyurethanes, Chemistry and Technology, Part II, Interscience, New York, 1964. When used in the preparation of rigid polyurethane foams, either as the sole polyol component or as a major proportion of the polyol component, the polyols (I) of the invention impart high compressive strength and enhanced fire resistance to the resulting foams.

DETAILED DESCRIPTION OF THE INVENTION

The novel polyols (I) of the invention are obtained conveniently from the corresponding diphenylsulfone polycarboxylic acids having the formula:

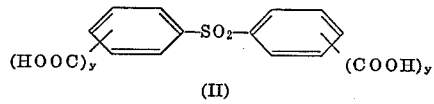

wherein $x$ and $y$ have the significance hereinbefore defined, by subjecting said polycarboxylic acids to amidation using procedures conventional in the art for converting polycarboxylic acids to the corresponding amides. Illustratively the polycarboxylic acid (II) is converted to the corresponding poly(acid halide), as by reaction with thionyl chloride, thionyl bromide, phosgene, phosphorus oxychloride, and the like. If desired, said reaction can be carried out in the presence of an inert organic solvent i.e., an organic solvent which is inert under the conditions of the reactants or interfere in any way with the desired course of the reaction. Examples of such solvents are benzene, toluene, xylene, diethyl ether, tetrahydrofuran, dimethylformamide, Decalin, Tetralin, and the like.

The acid halide so obtained is then reacted with the appropriate alkanolamine $HO-C_nH_{2n}-NH_2$ (III) wherein $C_nH_{2n}$ has the significance hereinbefore described. Advantageously the alkanolamine (III) is employed in at least stoichiometric proportions i.e., 1 mole of alkanolamine for each halocarbonyl group present in the poly (acid halide). Preferably the alkanolamine is employed in the excess and most preferably in an amount corresponding to at least 2 moles of alkanolamine for each halocarbonyl group so that there is sufficient alkanolamine present to take up all the hydrogen halide eliminated in the condensation.

The reaction between the acid halide and the alkanolamine (III) is advantageously carried out at ambient temperatures (i.e., of the order of 20° C. to 30° C.) though higher or lower temperatures can be employed, if desired. The reaction is preferably carried out in the presence of an inert organic solvent such as those defined and exemplified above. Generally speaking, when the alkanolamine is employed in the preferred proportion as described above, the corresponding alkanolamine hydrohalide separates from solution and can be removed by filtration, centrifugation and the like procedures. The filtrate contains the desired polyol (I) which latter can be isolated by evaporation of the filtrate to dryness. The polyol (I) so obtained can be purified, if desired, by conventional procedures such as by recrystallization.

An alternative method of preparing the polyols (I) is available in those cases wherein there are two carboxamide groups in each ring of the polyol (I) and, further, wherein the carboxamido groups within each ring are attached to adjacent nuclear carbon atoms. In these cases the starting material in the preparation of the polyol (I) is the corresponding polycarboxylic acid (II) or the dianhydride thereof. When the acid itself is employed as starting material the first step in its conversion to the desired polyol is the synthesis of the corresponding dianhydride. This step can be accomplished by any of the conventional procedures, for example, by refluxing the free acid with excess acetic anhydride in accordance with the procedure described in U.S. Patent 3,022,320. The resulting dianhydride is then reacted with the appropriate alkanolamine (III). If the dialkanolamine (III) is employed in an amount corresponding to at least 2 moles of dialkanolamine (III) per anhydride group, the desired polyol (I) will be formed directly. If the dialkanolamine (III) is employed in an amount less than this, e.g., of the order of 1 mole of dialkanolamine (III) per anhydride group, there will be formed the corresponding N-(hydroxyalkyl) imide which, on reaction with a further molar proportion (i.e., 1 mole per imide group) of dialkanolamine (III) yields the desired polyol (I).

The reaction between the anhydride (or the intermediate imide if isolated) and the dialkanolamine (III) generally in exothermic and proceeds to completion without the need to apply external heat. However, in certain instances it may be necessary to heat the reaction mixture, e.g., to about 50° C. to 100° C., in order to ensure completion of the reaction. The reaction can be accomplished in the presence of an inert organic solvent, if desired, such as those exemplified above, but is generally accomplished satisfactorily without the need to use any solvent.

The diphenylsulfone polycarboxylic acids (II) (or the anhydrides of those which are capable of forming same) employed as starting materials in preparing the novel polyols of the invention are well-known in the art, as are methods for their preparation; see, for example, U.S. Patents 2,673,218 and 3,022,320. The alkanolamines (III) employed as starting materials in preparing the novel polyols of the invention are also well-known in the art, as are methods for their preparation; see, for example, Chemistry of Carbon Compounds, vol. IA, p. 689 et seq., edited by E. H. Rodd, Elsevier, New York, 1951. Illustrative of said alkanolamines are ethanolamine, propanolamine, butanolamine, 1 - aminopropan - 2 - ol, 2 - aminopropan - 1 - ol, 1-aminobutan-2-ol, 1-amino-2-methyl-propan-2-ol, and 1-aminopentan-5-ol.

While the invention has been described in terms of compounds prepared by amidating the appropriate carboxylic acid (II) with a single alkanolamine (III) it will be appreciated that, by carrying out said amidation using a mixture of two or more alkanolamines, it is possible to produce a polyol (I) wherein the various hydroxyalkyl moieties are not identical. Such mixed amides are also within the scope of this invention and are clearly useful as intermediates for the same purpose, and using the same procedures, as described above for the compounds of the Formula I.

Similarly, where the polyols of the invention are prepared through the intermediate formation of an N,N'-di(hydroxyalkyl)imide the latter can be reacted with an alkanolamine other than the one used to form the intermediate imide from the starting carboxylic anhydride. There is thereby obtained a mixed amide in which the two amide groups derived from each anhydride moiety carry different hydroxyalkyl substituents.

The following examples describe the manner and process of making and using the invention and set forth the best mode contemplated by the inventors of carrying out the invention but are not to be construed as limiting.

EXAMPLE 1.—N,N',N'',N'''-tetra(2-hydroxyethyl) diphenylsulfone-3,3',4,4'-tetracarboxamide (A) N,N' - di(2-hydroxyethyl) diphenylsulfone-3,3',4,4'-tetracarboxylic acid diimide.—A 100 ml. round bottomed flask fitted with a stirrer, reflux condenser and thermometer was flushed with nitrogen and then charged with 25 g. (0.0697 mole) of diphenylsulfone - 3,3',4,4'-tetracarboxylic acid dianhydride and 8.5 g. (0.1395 mole) of ethanolamine. An immediate exothermic reaction took place and rapid stirring was effected under a nitrogen blanket. When the exotherm subsided the resulting product was stirred and heated at 120° C. to 140° C. for 40 minutes. At the end of this period the reaction mixture solidified to a white solid (25.9 g.) having a melting point of 207° C. to 216° C. A 5.1 g. sample was refluxed for 4 hrs. in 100 ml. of ethanol. The resulting solution was cooled to room temperature (circa 25° C.) and the crystalline solid which separated was isolated by filtration. There was thus obtained 4.6 g. of N,N'-di(2-hydroxyethyl) diphenylsulfone - 3,3',4,4' - tetracarboxylic acid diimide in the form of a white microcrystalline solid having a melting point 219° C. to 221° C.

*Analysis.*—Calc'd for $C_{20}H_{16}N_2SO_8$: C, 54.15; H, 3.63; N, 6.32. Found: C, 53.89; H, 3.50; N, 6.33.

(B) N,N',N'',N'''-tetra(2 - hydroxyethyl) diphenylsulfone-3,3',4,4'-tetracarboxamide.—A sample (5 g.:0.0113 mole) of the diimide prepared as described in Part A above was mixed with 1.8 g. (0.029 mole) of ethanolamine. An exothermic reaction occurred immediately and the temperature rose to 40° C. When no further spontaneous increase in temperature occurred, the mixture was heated at circa 55° C. for about 5 minutes. At the end of this time the mixture solidified. The resulting solid was pulverized under acetone and the crushed solid was isolated by filtration and dried. There was thus obtained 6.2 g. (97% theoretical yield) of N,N',N'',N''' - tetra(2 - hydroxyethyl) diphenylsulfone-3,3',4,4'' - tetracarboxamide in the form of a solid having a melting point of 185° C. to 196° C.

EXAMPLE 2.—N,N',N'',N'''-tetra(2-hydroxyethyl) diphenylsulfone-3,3',4,4'-tetracarboxamide A total of 34.05 g. (0.558 mole) of ethanolamine was added rapidly with stirring to 50 g. (0.1395 mole) of diphenylsulfone-3,3',4,4'-tetracarboxylic acid maintained under an atmosphere of nitrogen. An exothermic reaction ensued immediately. The temperature rose to a maximum of 150° C. When the temperature began to fall, external heat was applied to maintain the temperature at 155° C. to 160° C. for a period of a further 1.5 hr. There was thus obtained 67.7 g. of a clear brown resin. This material (aliquot) recrystallized from water gave a white solid having a melting point of 190° C. to 197° C. which was N,N',N'',N'''-tetra(2-hydroxyethyl) diphenylsulfone-3,3',4,4'-tetracarboxamide contaminated with a trace of the imide prepared as described in Example 1, part A. This product is separated into its components by fractional crystallization from ethanol.

EXAMPLE 3.—N,N',N'',N'''-tetra(2-hydroxyethyl) diphenylsulfone-3,3',4,4'-tetracarboxamide A solution of 10 g. (0.0279 mole) of diphenylsulfone-3,3',4,4'-tetracarboxylic acid in 100 ml. of benzene is stirred and cooled while a total of 82.8 g. (0.696 mole) of thionyl chloride is added thereto. The resulting mixture is heated under reflux for 6 hrs. before distilling the excess thionyl chloride and benzene under reduced pressure. The residual acid chloride is dissolved in 100 ml. of benzene and the solution is stirred while a total of 13.62 g. (0.222 mole) of ethanolamine is added. An exothermic reaction occurs and, when this subsides, the resulting mixture is heated under reflux for a short period. The solid which has separated (ethanolamine hydrochloride) is isolated by filtration and the filtrate is evaporated to dryness. There is thus obtained N,N',N'',N'''-tetra(2-hydroxyethyl) diphenylsulfone-3,3',4,4'-tetracarboxamide.

EXAMPLE 4.—N,N',N'',N'''-tetra(2-hydroxyethyl) diphenylsulfone-2,2',4,4'-tetracarboxamide Using the procedure described in Example 3, but replacing diphenylsulfone-3,3',4,4'-tetracarboxylic acid by diphenylsulfone-2,2',4,4'-tetracarboxylic acid, there is obtained N,N',N'',N'''-tetra(2-hydroxyethyl) diphenylsulfone-2,2',4,4',tetracarboxamide.

Similarly, using the procedure described in Example 1, but replacing diphenylsulfone - 3,3',4,4' - tetracarboxylic acid by diphenylsulfone-2,2'-dicarboxylic acid, diphenylsulfone-4,4'-dicarboxylic acid, diphenylsulfone-3,4,4'-tricarboxylic acid, or diphenylsulfone-2,3',4',5-tetracarboxylic acid, there are obtained N,N'-di(2-hydroxyethyl) diphenylsulfone-2,2'-dicarboxamide, N,N' - di(2 - hydroxyethyl) diphenylsulfone-4,4'-dicarboxamide, N,N',N''-tri-(2-hydroxyethyl) diphenylsulfone-3,4,4'-tricarboxyamide, and N,N',N'',N'''-tetra(2-hydroxyethyl) diphenylsulfone-2,3',4',5-tetracarboxamide, respectively.

EXAMPLE 5.—N,N',N'',N'''-tetra(3-hydroxypropyl) diphenylsulfone-3,3',4,4'-tetracarboxamide Using the procedure described in Example 1, part A, but replacing ethanolamine by propanolamine, there is obtained N,N' - di(3 - hydroxypropyl) diphenylsulfone-3,3',4,4'-tetracarboxylic acid diimide. The latter is reacted with further propanolamine, using the procedure described in Example 1, part B, to yield N,N',N'',N'''-tetra (3-hydroxypropyl) diphenylsulfone-3,3',4,4'-tetracarboxamide.

Similarly, using the procedure described in Example 1, part A, but replacing ethanolamine by butanolamine, 1-aminopropan-2-ol, 2-aminopropan-1-ol, 1-aminobutan-2-ol, 1-amino-2-methylpropan-2-ol or 1-aminopentan-5-ol, and reacting the N,N'-disubstituted diimide so formed with a further quantity of the same alkanolamine in accordance with the procedure described in Example 1, part B, there are obtained N,N',N'',N''' - tetra(4 - hydroxybutyl), N,N',N'',N'''-tetra(2-hydroxypropyl), N,N',N'', N'''-tetra(1-methyl-2-hydroxyethyl), N,N',N'',N'''-tetra-(2-hydroxybutyl), N,N',N'',N'''-tetra(2-hydroxy-2-methylpropyl), and N,N',N'',N'''-tetra(5-hydroxypentyl) diphenylsulfone-3,3',4,4'-tetracarboxamide, respectively.

We claim:

1. A compound having the formula:

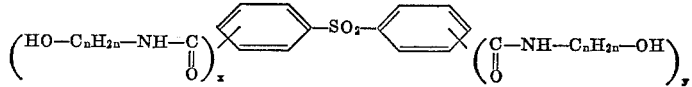

wherein $C_nH_{2n}$ represents alkylene from 2 to 6 carbon atoms inclusive, and $x$ and $y$ are each integers from 1 to 2.

2. N,N',N'',N''' - tetra(2 - hydroxyethyl) diphenylsulfone-3,3',4,4'-tetracarboxamide.

References Cited

UNITED STATES PATENTS 3,050,524  8/1962  Yale et al. _____ 260—559

HENRY R. JILES, *Primary Examiner.*

HARRY I. MOATZ, *Assistant Examiner.*

U.S. Cl. X.R.

260—2.5, 77, 77.5, 326, 544, 558